United States Patent [19]

Walsh et al.

[11] Patent Number: 4,671,551
[45] Date of Patent: Jun. 9, 1987

[54] MOVABLE MOLDING FOR A VEHICLE

[75] Inventors: Leo F. Walsh, Bloomfield Hills; Frank A. Mulso, Lake Orion, both of Mich.

[73] Assignee: Chrysler Motors Corporation, Highland Park, Mich.

[21] Appl. No.: 901,396

[22] Filed: Aug. 28, 1986

[51] Int. Cl.⁴ .............................................. B60R 19/42
[52] U.S. Cl. .................................. 293/126; 293/128; 293/135
[58] Field of Search .............. 296/126, 128, 132, 134, 296/135, 136, 137

[56] References Cited

U.S. PATENT DOCUMENTS

| | | | |
|---|---|---|---|
| 2,062,328 | 12/1936 | Morrison | 293/135 |
| 2,093,734 | 9/1937 | Place | 24/253 |
| 2,174,252 | 9/1938 | Altmyer | 293/127 |
| 2,187,952 | 1/1940 | Rusche | 293/127 |
| 2,677,862 | 5/1954 | Flora | 24/73 |
| 2,691,545 | 10/1954 | Lyon | 293/127 |
| 2,820,270 | 1/1958 | Scott | 24/73 |
| 3,501,186 | 3/1970 | Wilcox et al. | 237/189.35 |
| 3,817,565 | 6/1974 | Geiger | 293/136 |
| 3,820,771 | 6/1974 | Kerr | 267/116 |
| 3,937,508 | 2/1976 | Glance et al. | 293/136 |
| 4,059,301 | 11/1977 | Meyer | 293/120 |
| 4,299,418 | 11/1981 | Dossin | 293/126 |
| 4,629,232 | 12/1986 | Zimlich et al. | 293/128 |

Primary Examiner—Robert R. Song
Attorney, Agent, or Firm—Edward A. Craig

[57] ABSTRACT

A movable molding is provided for a vehicle on the body adjacent to the wrap-around end portion of the bumper. The molding and end portion of the bumper have mating abutment surfaces. When the bumper moves towards the vehicle upon impact, the mating abutment surfaces interact causing the molding to be moved against the action of a spring along a slide element thus avoiding damage to the parts. Upon retraction of the bumper to its normal position, the spring biases the molding back to its normal position lying against the body of the vehicle.

6 Claims, 7 Drawing Figures

MOVABLE MOLDING FOR A VEHICLE

BACKGROUND OF THE INVENTION

Government regulations have mandated that front and rear bumpers of vehicles be so constructed and mounted as not to be damaged as a consequence of low speed impact with other vehicles or fixed structure. The prevailing method for accomplishing this has been to mount the bumper onto a vehicle by means of an energy device, such as a shock absorbing structure. When the bumper is impacted at low speeds, the energy absorbing device collapses, absorbing the energy of impact. This collapse takes with it the bumper which moves towards the vehicle. After being impacted, the energy absorbing devices bias the bumper back to its normal position.

One problem which has been encountered in connection with such structures is the maintenance of the integrity of moldings typically provided on the fenders of vehicles adjacent to and in-line with wrap-around end portions of bumpers which extend around the sides of the vehicles. As the bumper is moved toward the vehicles, the wrap-around end portions also, of course, move. These end portions will impact moldings which are mounted on the fenders closely adjacent thereto. If the moldings are rigid pieces, and rigidly mounted, they will be damaged upon impact with the end portions of the bumper.

One solution to this problem has been the use of flexible moldings. When such moldings are impacted, they deform without damage. Upon retraction of the bumper after impact, such moldings may be straightened out by hand or may return to normal positions as a consequence of inherent resiliency.

It has been desired to use a molding fabricated of rigid material. Such a molding will not, of course, flex upon being impacted by an end portion of a bumper. It is necessary that such rigid moldings not be damaged by the bumper upon impact. One solution to this problem is illustrated in U.S. patent application Ser. No. 06/776,077 filed Sept. 13, 1985. In this solution, spring mounting means are provided for a molding to permit outward deflection of the molding upon bumper movement, with the end portions of the bumper sliding beneath the molding thereby avoiding damage.

In accordance with the present invention, a movable molding is provided. The molding is mounted on a slide element and is capable of sliding therealong when impacted by the end portion of a bumper. Tension spring means are provided and are connected between the molding and vehicle body so that after impact by the bumper and subsequent retraction of the bumper, the molding will be biased by the spring means back to its original position.

SUMMARY OF THE INVENTION

A movable molding for a vehicle having a body and a bumper mounted on one of the forward and rearward ends thereof is provided. Energy absorbing structure mounts the bumper to the vehicle. The energy absorbing structure biases the bumper to a normal position but permits movement of the bumper towards the vehicle upon impact. The bumper has an end portion extending around the side of the vehicle body. The molding comprises a relatively rigid element having an underside and exterior side. Spring means are provided on the underside of the molding. The spring means are connected between the molding and the vehicle with the molding lying on the exterior of the vehicle body in alignment with, and adjacent to, the bumper end portion.

A slide element is connected to the vehicle body. One of the slide element and molding has projection structure thereon and the other of the slide element and the molding has recess means thereon. A projection structure is received within the recess means and maintains the molding in position relative to the vehicle body while permitting the molding to slide in the direction of bumper movement.

The spring means comprises a tension spring having one end connected to the molding at a point remote from the bumper end portion and a second end connected to the vehicle body at a point closer to the bumper end portion. The molding has an abutment surface adjacent to the bumper end portion. The bumper end portion has a mating abutment surface. The spring means biases the molding abutment surface closely adjacent to the bumper abutment surface. The abutment surface of the bumper end portion is adapted to contact the molding abutment surface and move the molding on the slide element when the bumper is moved towards the vehicle upon impact with the molding moving against the action of the spring means. The spring means is effective to bias the molding back to the its original position upon retraction of the bumper end portion after impact.

In one preferred embodiment the molding has an inturned flange on the underside thereof along each side edge thereof defining the projection structure. The recess means is located on the slide element. The slide element is preferably a plate having a plurality of tab structures projecting from each side thereof. Each tab structure includes at least two tabs, one of which is offset from the face of the plate to define with the other a recess. The recesses defined by the tab structures comprise the aforementioned recess means. The inturned flanges of the molding are received therein. Preferably, the offset tab of at least one tab structure comprises a wall portion extending at substantially right angles from the plate with a portion thereof spaced from the plate and acting as a spring which presses against the edge of the inturned flange received in the recess defined by the tab structure to firmly mount the molding. A tab element extends at substantially right angles from the wall portion.

In another embodiment, the molding has a bottom wall on the underside thereof. The bottom wall has at least one elongated recess formed therein defining the aforesaid recess means. The slide element has the aforesaid projection structure formed thereon which is received in the recess. Preferably, both the recess and projection structure are formed within inwardly directed sidewalls whereby the recess and projection structure dovetail together to thereby hold the molding in place.

DESCRIPTION OF PREFERRED EMBODIMENTS

Figure 1:
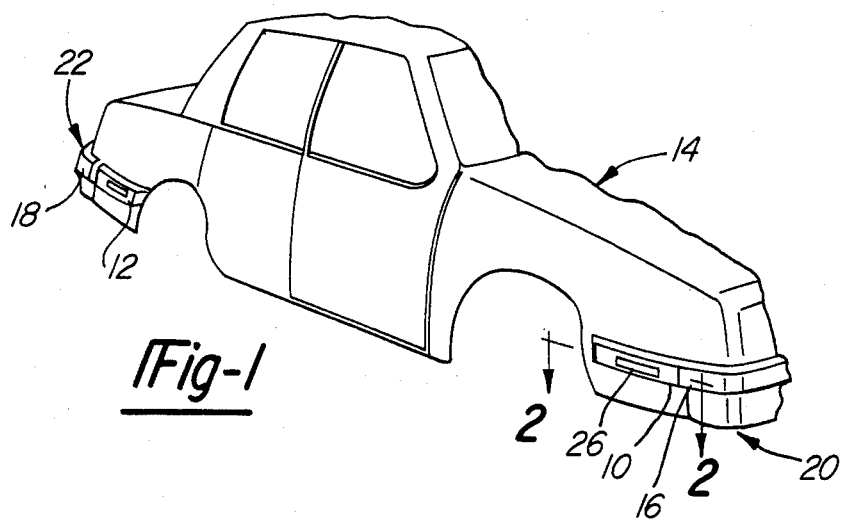
FIG. 1 is a view in perspective of a portion of a car with the movable molding forming one embodiment of the present invention illustratively mounted on the right hand front and rear fenders.

Referring to FIG. 1, it will be noted that movable vehicle moldings 10, 12 in accordance with the present invention are mounted on the sides of the front and rear right fenders of an automobile 14. Mirror image moldings are mounted on the opposite or left hand side of the automobile. Front molding 10 and rear molding 12 have substantially the same construction and therefore only the front molding 10 will be described in detail. It will be noted that each molding is mounted in line with and adjacent to the end portions 16, 18 of the front bumper element 20 and rear bumper element 22. These portions extend around the side of the vehicle.

The bumper elements 20, 22 are mounted on the automobile 14 for movement relative to the automobile body upon impact. Energy absorbing devices, such as shock absorbers, are provided to mount and bias the bumper elements in a normal position such, for example, as illustrated in U.S. Pat. Nos. 3,937,508 and 4,059,301. The specific type of energy absorbing device is not germane to the present invention, the present invention being usable with various styles of such devices. The energy absorbing devices permit movement of the bumper a short distance towards the vehicle on which they are mounted after a low speed impact with another vehicle or stationary structure without appreciable damage to the bumper structure. After the impacting force is dissipated, the bumper structure is returned to its original position by the energy absorbing devices. Such bumper mounting constructions are common in the automotive industry at this time.

The movable moldings of the present invention are designed to accommodate limited bumper motion without damage to the molding. The molding 10 is a relatively rigid trim piece designed to stylistic merge with the front bumper element 20. The molding 10 includes a rectangular opening 24 which surrounds a lens 26, usually amber in color, which is mounted on the automobile body structure. A lamp is provided behind the lens to illuminate the lens when the vehicle lights are energized. Such lamps are commonly referred to as "fender marker lamps" and the molding 10 as a "marker surround".

The molding 10 may be fabricated as, for example, a stamped brass element. The molding 10 is elongated in the direction of the length of the automobile 14. It includes an exterior side comprising an outer wall portion 28 from the edges of which depend sidewall portions 30, 32 which space the outer wall portion 28 from the automobile body structure. The sidewall portions 30, 32 terminate in inwardly turned flange portions 34, 36.

Figure 2:
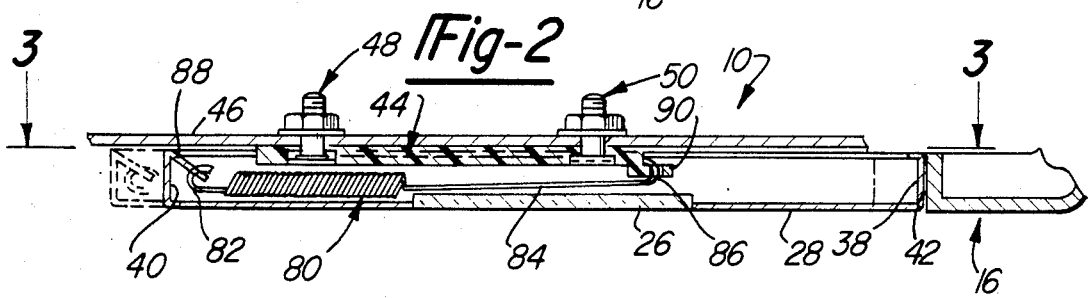
FIG. 2 is a sectional view taken substantially along the line 2—2 of FIG. 1 looking in the direction of the arrows.
Figure 3:
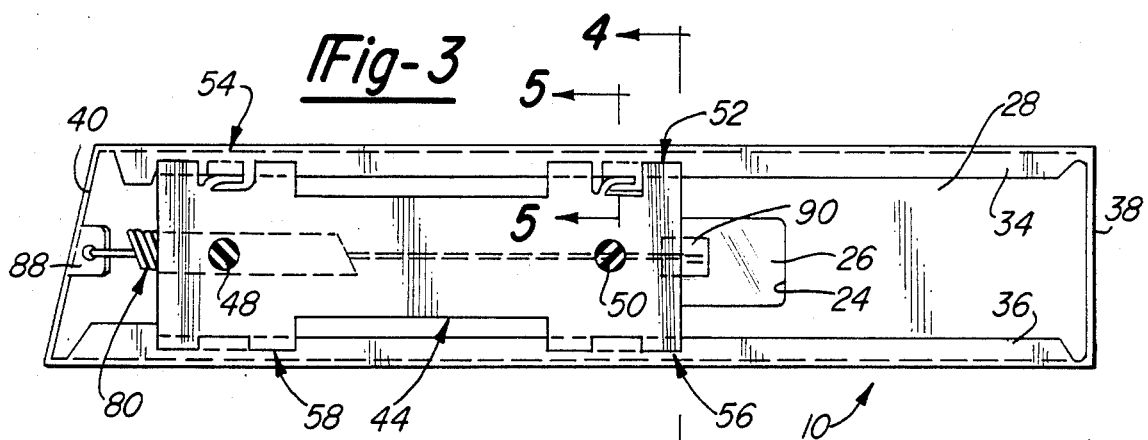
FIG. 3 is a sectional view taken substantially along the line 3—3 of FIG. 2 looking in the direction of the arrows.
Figure 4:
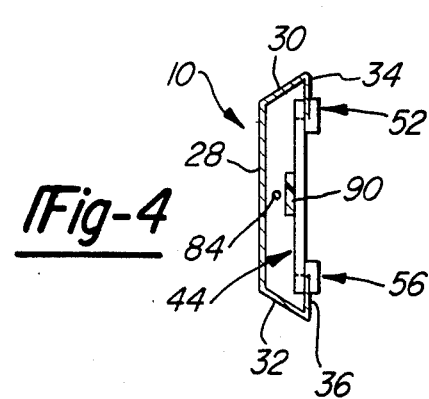
FIG. 4 is a sectional view taken substantially along the line 4—4 of FIG. 3 looking in the direction of the arrows.
Figure 5:
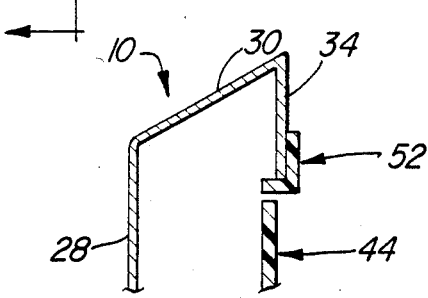
FIG. 5 is a sectional view taken substantially along the line 5—5 of FIG. 3 looking in the direction of the arrows.

The end of the molding adjacent to the bumper end portion 16 is provided with an abutment surface 38. The end of the molding 10 remote from end portion 16 is closed by means of a wall 40. The bumper end portion 16 has a mating abutment surface 42. In operation, the surfaces 38, 42 contact each other at such times as bumper element 20 is moved toward the molding 10 upon impact of the bumper. The abutment action which results causes the molding 10 to be moved out of the way of the bumper end portion 16 as will be later described. As will be noted in FIG. 2, no space is provided between the surfaces 38, 42. Such a space, which is visually objectionable, is normally needed but is avoided in the present construction.

Figure 6:
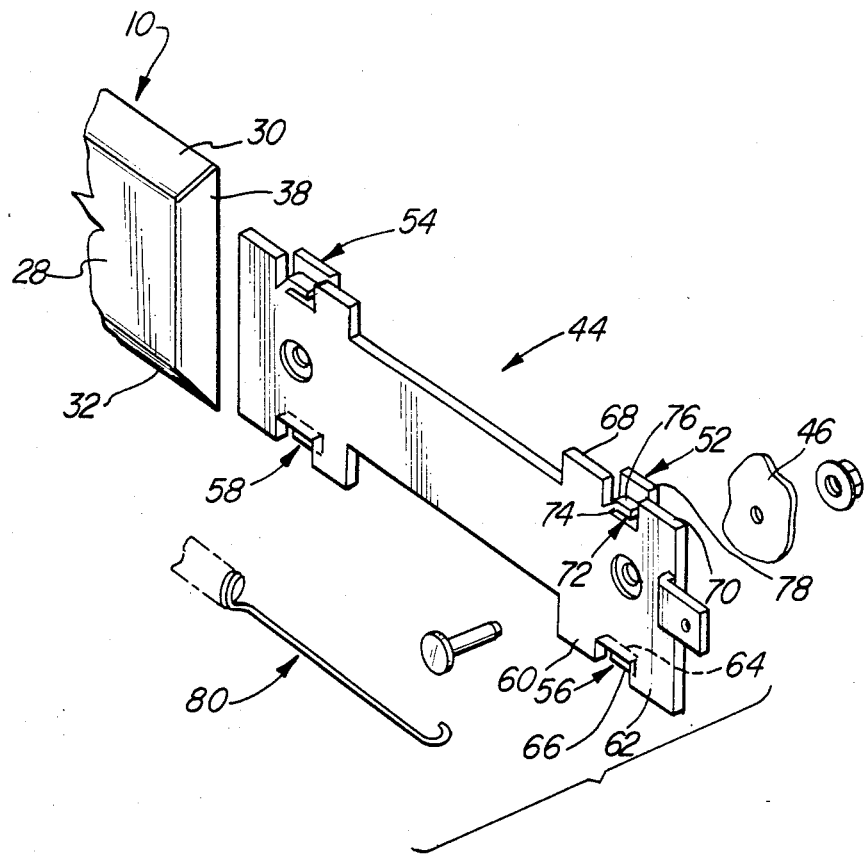
FIG. 6 is an exploded view of portions of the right hand molding as viewed in FIG. 2.

The molding 10 is mounted on a slide element 44. The slide element 44 is connected to vehicle body structure 46 by means of staking elements 48, 50. The slide element 44 comprises a plate having a plurality of tab structures 52, 54, 56, 58 projecting from the sides thereof. Each tab structure includes three tabs, one of which is offset from the face of the slide element plates to define with the others a recess. The tab structures 52, 54 on one side of the slide element differ from the tab structures 56, 58 on the other side. Illustratively, as best seen in FIG. 6, tab structure 56 includes tabs 60, 62 which extend straight outwardly from the slide element plate with the third tab being defined by wall portion 64 first bent outwardly at right angles to the plane defined by the slide element 44 and then bent parallel to the face of the slide element to define tab 66.

Tab structures 52, 54 on the other side of the slide element also have, as illustratively shown in tab structure 52, straight tabs 68, 70 with a wall portion 72 therebetween which extends at substantially right angles to the plane of the slide element plate with a portion 74 only connected to the slide element and a portion 76 spaced therefrom. This structure acts as a spring which presses against the edge of the inturned flange 34 received in the recess defined by the tab structure to firmly mount the molding. A tab element 78 extends at substantially right angles from the wall portion 72. This arrangement provides for firm mounting of the molding 10 on the slide elements 44 while permitting the molding 10 to be easily mounted by first inserting flange 34 into tab structures 52, 54 and then pressing down on the tab springs to permit insertion of flange 36 into tab structures 56, 58.

The spring means comprises a tension coil spring 80 having a hook 82 at one end and an elongated strand of wire 84 extending from the other end and terminating in a hook 86. A tab 88 having an opening therein extends from the wall 40 and is engaged by the hook 82. A second tab 90 with an opening therein extends from the slide element 44 with the other hook 86 being engaged therein. As will be appreciated, this arrangement results in the spring means being located on the underside of the molding 10 and connected between the molding 10 and vehicle body. The molding 10 is thus arranged in alignment with and adjacent to the bumper end portion 16. The hook 82 is connected to the molding 10 at a point remote from the bumper end portion 16 while the hook 86 is connected to the vehicle body at a point closer to the bumper end portion 16. When the abutment surface 42 of the bumper end portion 16 contacts the abutment surface 38 of the molding 10 upon movement of the bumper after impact, it will push the molding 10 along the slide element 44 thus extending the tension spring 80. The molding 10 thus moves against the action of the spring means. The coil spring 80 is effective to bias the molding 10 back to its original position upon retraction of the bumper end portion 16 after impact. It will thus be appreciated that the molding 10 is moved out of the way of the bumper end portion 16 when the bumper end portion 16 moves but it is returned to its originally designed position after the bumper moves back to its initial position.

Figure 7:
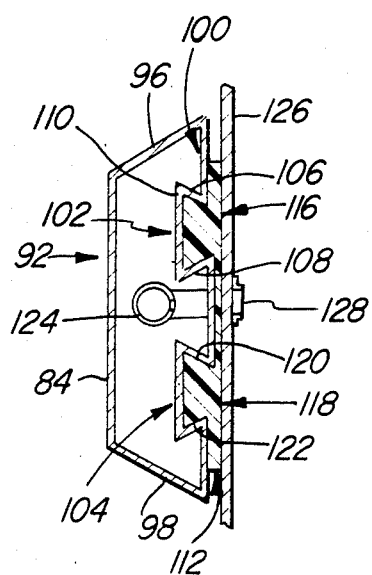
FIG. 7 is a transverse sectional view of an alternate embodiment of the molding.

Another embodiment of the molding is illustrated in FIG. 7. As thereshown, the molding 92 also includes an outer wall portion 84 and sidewall portions 96, 98. However, a wall 100 is provided on the underside of the molding 92. The wall 100 has two recesses 102, 104 provided therein. The recesses 102, 104 are elongated and extend for the length of the molding 92. The recesses are formed with inwardly directed sidewalls 106, 108 joined together by a wall 110.

A slide element 112 is provided and is secured to vehicle body structure 114. The slide element 112 is provided with a pair of projections 116, 118 which also have inwardly directed sidewalls 120, 122. The projections 116, 118 are received within the recesses 102, 104 and dovetail together to thereby hold the molding in place. A tension spring 124 is provided to bias the molding 92 as previously described. The molding 92 moves along the slide element 112 after bumper impact as previously described and is biased by the spring 124 in the same fashion. The construction is first assembled and then mounted on vehicle panels 126 by means of staking elements 128.

We claim:

1. A movable molding for a vehicle having a body and a bumper mounted on one of the forward and rearward ends thereof, energy absorbing structure mounting the bumper to the vehicle, said energy absorbing structure biasing the bumper to a normal position but permitting movement of the bumper toward the vehicle upon impact, said bumper having an end portion extending around a side of the vehicle body, said molding comprising a relatively rigid element having an underside and an exterior side, spring means on the underside of the molding, said spring means being connected between the molding and the vehicle with the molding lying on the exterior of the vehicle body in alignment with, and adjacent to, said bumper end portion, a slide element connected to the vehicle body, one of the slide element and molding having projection structure thereon and the other of the slide element and the molding having recess means thereon, the projection structure being received within the recess means and maintaining the molding in position relative to the vehicle body while permitting the molding to slide in the direction of the bumper movement, said spring means comprising a tension spring having one end connected to the molding at a point remote from the bumper end portion and a second end connected to the vehicle body at a point closer to the bumper end portion, the molding having an abutment surface adjacent to the bumper end portion, the bumper end portion having a mating abutment surface, said spring means biasing the molding abutment surface closely adjacent to the bumper abutment surface, the abutment surface of the bumper end portion adapted to contact the molding abutment surface and move the molding on the slide element when the bumper is moved towards the vehicle upon impact with the molding moving against the action of said spring means, said spring means being effective to bias the molding back to its original position upon retraction of the bumper end portion after impact.

2. A molding for a vehicle as defined in claim 1, further characterized in that the molding has an inturned flange on the underside thereof along each side edge thereof defining the projection structure, the recess means being located on the slide element.

3. A molding for a vehicle as defined in claim 2, further characterized in that the slide element comprises a plate having a plurality of tab structures projecting from the sides thereof, each tab structure including at least two tabs one of which is offset from the face of the plate to define with the other a recess, the recesses defined by the tab structures comprising the aforementioned recess means, the inturned flanges of the molding being received therein.

4. A molding for a vehicle as defined in claim 3, further characterized in that the offset tab of at least one tab structure comprises a wall portion extending at substantially right angles from a plate with a portion thereof spaced from the plate and acting as a spring which presses against the edge of the inturned flange received in the recess defined by the tab structure to firmly mount the molding, and a tab element extending at substantially right angles from the wall portion.

5. A molding for a vehicle as defined in claim 1 further characterized in that the molding has a bottom wall on the underside thereof, the bottom wall having at least one elongated recess formed therein defining the aforesaid recess means, the slide element having the projection structure formed thereon and received in said recess.

6. A molding for a vehicle as defined in claim 5, further characterized in that both the recess and projection structure are formed with inwardly directed sidewalls whereby the recess and projection structure dovetail together to thereby hold the molding in place.

* * * * *